United States Patent [19]
Marwick

[11] 3,938,335
[45] Feb. 17, 1976

[54] HEAT ENGINES
[76] Inventor: Edward F. Marwick, 5149 W. Morse Ave., Skokie, Ill. 60076
[22] Filed: July 30, 1973
[21] Appl. No.: 383,828

[52] U.S. Cl. .................. 60/673; 60/649; 122/28; 122/31 R; 417/92; 417/118; 417/207; 417/379
[51] Int. Cl.² .................. F01K 25/00; F04B 17/00
[58] Field of Search ............... 122/31, 28; 165/111; 417/118, 92, 392, 379, 207; 60/649, 673

[56] References Cited
UNITED STATES PATENTS

| | | | |
|---|---|---|---|
| 128,623 | 7/1872 | Hofmann | 417/118 |
| 2,222,575 | 11/1940 | Schutte | 122/31 R |
| 2,561,471 | 7/1951 | Hatfield | 122/31 R |

FOREIGN PATENTS OR APPLICATIONS

| | | | |
|---|---|---|---|
| 114,120 | 9/1929 | Germany | 122/31 R |

*Primary Examiner*—Martin P. Schwadron
*Assistant Examiner*—Allen M. Ostrager
*Attorney, Agent, or Firm*—Joel D. Talcott

[57] ABSTRACT

A de facto wall-less heat exchanger system wherein a non-volatile heated liquid from a nuclear, geothermal or other source of heat is introduced into a chamber containing a highly volatile fluid which is chemically non-reactive with the non-volatile liquid. The volatile fluid is converted to a pressurized vapor which may be used to drive a turbine for the production of useful energy, to pump the non-volatile liquid or to pump a different fluid.

10 Claims, 4 Drawing Figures

HEAT ENGINES

This invention relates to energy utilization and, more particularly, to means for converting the output of a source of heat, such as a nuclear reactor or a geothermal or other non-nuclear heat source, into useful energy.

It is the general practice in the prior art, when one liquid has been heated and it is desired to obtain useful work from this heated liquid, to pass the heated liquid through a heat exchanger so that the heat may be transferred to a working fluid on the other side of a wall of solid material. For example, hot liquid sodium from a nuclear reactor can be passed through a heat exchanger to convert water on the other side of the wall to steam for the production of useful power.

If the heated liquid itself is to be vaporized, as is done in a boiling water reactor, the use of a heat exchanger is avoided. However, this requires either the use of a lower density fluid, resulting in less power, or the production of excessive pressure in this heated working fluid requiring the use of substantially thicker containing walls.

In a nuclear reactor, the liquid to be heated is selected more for its nuclear properties than for its thermodynamic properties. For example, $H_2O$ is a very good moderator for neutrons and is commonly used with slow neutron reactors while $D_2O$ gives better neutron economy but is costly. Liquid sodium is the first choice for use in fast-neutron breeder reactors because of its very good heat conductivity, low vapor pressure, low neutron absorbtion and relatively low cost.

In fast neutron breeder reactors, lithium is generally not used because of its greater moderating ability and greater expense. Lithium has two isotopes, $Li^6$ (7.4%) which has a high neutron cross-section and $Li^7$ (92.6%) which has a very low cross-section. A fast neutron reactor using lithium would produce tritium.

In my previously filed U.S. patent application Ser. No. 355,016, filed on Apr. 27, 1973, I have disclosed the use of liquid sodium, liquid lithium, a mixture of liquid sodium and liquid lithium, and the use of molten sodium hydroxide wherein the detonation of a blanketed nuclear explosive heats a low volatility liquid which is quickly passed through heat exchangers.

In accordance with this invention, the heated liquid is introduced into a chamber containing a volatile fluid which will not chemically react with the heated liquid. For example, it is well-known that sodium and lithium do not chemically react with many hydrocarbons and that, at higher temperatures, sodium hydroxide does not combine with water. Thus, there is not need for a wall to separate the two liquids, so that time is saved, costs and lowered and the efficiency of the heat exchanger is significantly enhanced.

To enhance the efficiency of machinery for the production of electricity and to reduce thermal pollution, a "topping cycle" might be used to convert heat energy to useful power before the heat containing fluid has been passed through a conventional heat exchanger. If lithium is the non-volatile liquid, potassium, having a boiling point of 774°C., at which lithium has vapor pressure of but a couple of milimeters of mercury, may be used as the volatile working fluid. In lower temperature ranges, potassium may be used as the non-volatile liquid.

Since electricity cannot easily be stored for peak load delivery times, it is desirable to pump water into hydrostorage reservoirs to be used for generating hydro-electric power at such peak load times. An economical means of pumping both the reactor liquid and water by the same engine that also provides additional turbine power is provided in accordance with this invention.

It is an object of this invention to create an engine wherein the heat energy of a non-volatile fluid is transferred to a working fluid without the use of walls between the two liquids.

It is another object of this invention to create an engine wherein the heat energy of a non-volatile liquid is directly transferred to a volatile liquid whose vapor is used to pump the non-volatile liquid without the use of pistons or rotary pumps.

It is an additional object of this invention to create an engine wherein the heat energy of a non-volatile liquid is directly transferred to a volatile liquid whose vapor is used to pump both the volatile liquid and another liquid without the use of pistons or rotator pumps.

It is a further object of this invention to create an engine which permits more economical use of electrical generating systems by enabling greater efficiency to be obtained from the system so that thermal pollution is lowered.

These and other objects and advantages of this invention will be readily apparent when the following specification is read in conjunction with the appended drawings, wherein.

Figure 1:
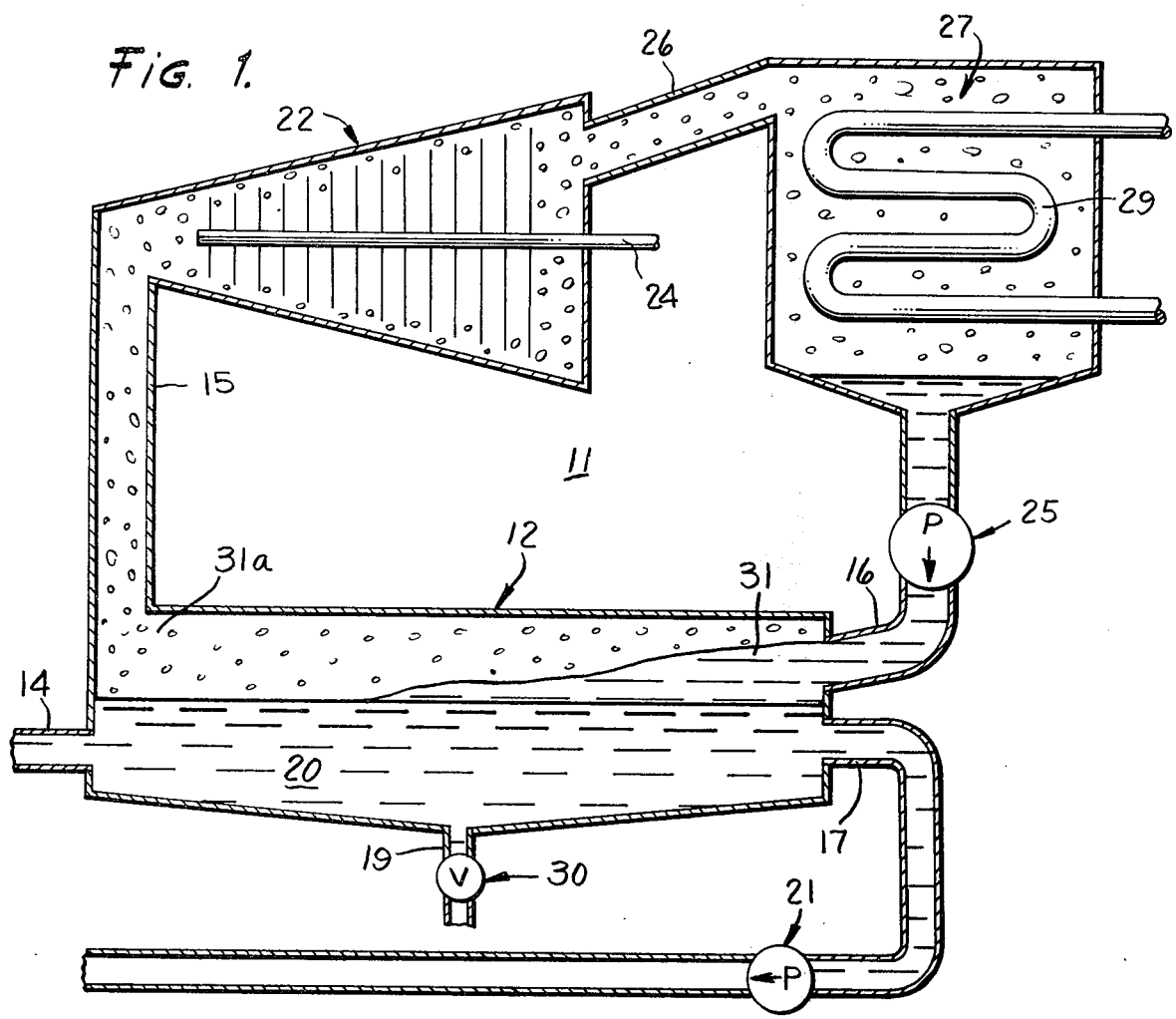
FIG. 1 is a schematic representation of an engine of this invention.

Referring now to the drawings, an engine 11 of this invention as illustrated in FIG. 1 and has a reaction chamber 12 having a plurality of pipes 14, 15, 16, 17, and 19 attached thereto.

The pipe 14 carries a heated non-volatile liquid 20 from a nuclear reactor (not shown) or other source of heat energy. The non-volatile liquid 20 may be used after passing immediately from the heat source or may be directed into the reaction chamber 12 after having been passed through a conventional heat exchanger (not shown). The non-volatile liquid 20 may be liquid sodium although many combinations of materials may be used in accordance with this invention. After substantial amounts of heat have been removed from the heated non-volatile liquid 20 within the reaction chamber 12, it is returned to the reactor through the pipe 17, propelled by a suitable pump 21, for further heating.

The pipe 15 connects the reaction chamber 12 to a turbine 22 which may be of any conventional type. The mechanical energy produced in the turbine 22 may be transferred through a turbine shaft 24 to power the pump 21 as well as other devices such as a pump 25 interposed in the pipe 16 and an electric generator (not shown) for the production of useful power.

A pipe 26 connects the turbine 22 to a condenser 27 having a cooling system 29 therein. The condenser 27 is connected by the pipe 16, through the pump 25, to the reaction chamber 12.

The pipe 19 may be situated at a low point of the reaction chamber 12 and contain a valve 30 so that particulate matter settling at the bottom of the reaction chamber 12 may be drained off as desired.

In accordance with this invention, a volatile working fluid 31 is provided in the reaction chamber 12 in contact with the heated non-volatile liquid 20. The volatile working fluid 31 must be substantially non-reactive with the non-volatile liquid 20 within the range of operating temperatures found in the reaction chamber 12. If the non-volatile liquid 20 is liquid sodium, the volatile working fluid 31 is preferably a volatile hydrocarbon such as octane or decane.

The heat from the non-volatile liquid 20 is transferred in the reaction chamber to the volatile working fluid 31 which is changed into a vapor 31a. The increased pressure in the reaction chamber forces the vapor 31a through the pipe 15 and into the turbine 22, the direction of flow of the vapor 31a being determined by the operation of the pump 25. This heated vapor is forced through the turbine 22 which converts its heat energy into mechanical energy in the turbine shaft 24 as previously mentioned. The vapor 31a then passes through the pipe 26 into the condenser 27 wherein it is cooled and converted back into a liquid form. The working fluid 31 is then pumped back into the reaction chamber 12 and the cycle is repeated.

It is readily apparent that by use of the engine 11, maximum efficiency in heat-to-mechanical energy conversion can be provided whereby a non-volatile liquid, such as sodium, can carry heat from a source such as a reactor and this heat can be transferred in a wall-less reaction chamber to a volatile liquid for operating a turbine, the volatile fluid being non-damaging to the turbine.

Figure 2:
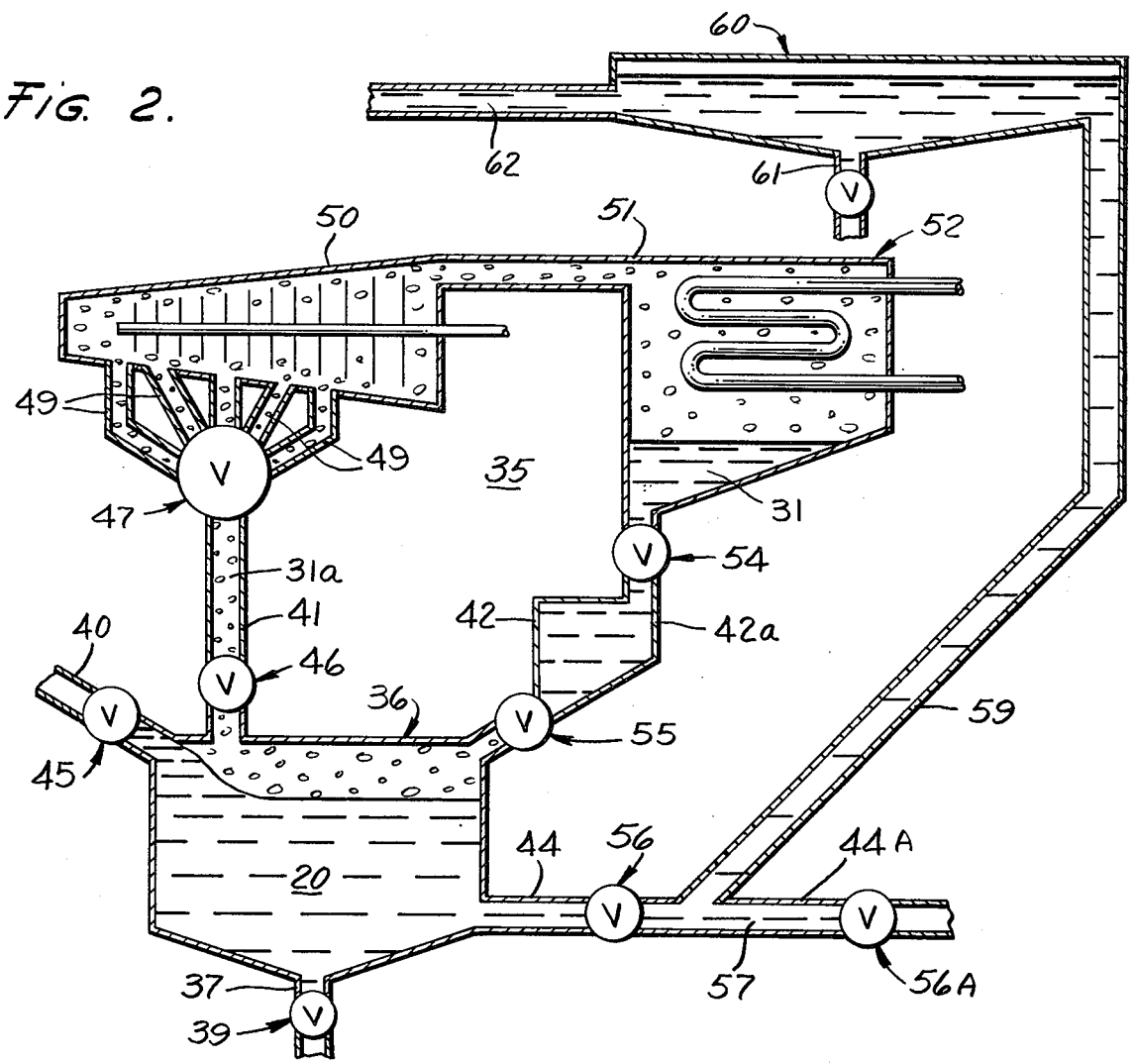
FIG. 2 is a schematic representation of another engine in accordance with this invention wherein a turbine is operated and a non-volatile heated liquid is pumped by the engine.

FIG. 2 illustrates an engine 35 which functions, to some extent, in a manner similar to the function of engine 11 of FIG. 1 but exhibits the additional ability to pump the non-volatile liquid 20.

A reaction chamber 36 which may have a drain pipe 37 and a valve 39 and a lower portion thereof has a plurality of pipes 40, 41, 42, and 44 extending therefrom. The pipe 40 carries the non-volatile liquid 20, as in FIG. 1, from the source of heat (not shown) and has a valve 45 interposed therein. The pipe 41 contains a valve 46 and carries the vaporized volatile working fluid 31a to a valve system 47 which may be a complex valve or a plurality of simple valves for controlling the flow of vapor through a plurality of tubes 49 to a turbine 50. If desired, the valve system 47 may be used to couple a plurality of reaction chambers, such as 36, to the turbine 50 so that vapor 31a from a plurality of sources may be used to provide smoother, more efficient operation for the turbine 50.

A pipe 51 connects the turbine 50 to a condenser 52 which is in turn connected to the reaction chamber 36 through the pipe 42. A pair of valves 54 and 55 are interposed in the pipe 42 around an enlarged central portion forming a chamber 42a.

The pipe 44 connects the reaction chamber 36 through a valve 56 to a junction 57. The junction 57 is connected by a pipe 59 to a reservoir 60 which may include drainage means 61 and preferably has an exit pipe 62 extending therefrom.

Operation of the engine 35 is as follows. To introduce heated non-volatile liquid 20 into the reaction chamber 35, the valve 45 is opened. At this time, valves 46 and 54 are also open while valves 55 and 56 are closed. As previously described, the volatile working fluid 31 is vaporized and the vapor 31a passes through the pipe 41 and the open valve 46 to the valve system 47. This valve system directs the vaporized working fluid selectively to various parts of the turbine 50 at different portions of the cycle to optimize the efficiency by which the heat energy from the working fluid is converted to mechanical energy in the turbine, in a manner well-known to those skilled in the art. If additional sources of vapor 31a are provided, the valve system 47 should further control the connection of the reaction chambers to the various portions of the turbine 50 to further optimize operation.

The vapor 31a is changed back to liquid form in the condenser 52 and settles in the chamber 42a after passing through the open valve 54. When the reaction chamber 36 is substantially filled, valves 45, 46 and 54 are closed and valves 55 and 56 are opened. The volatile working fluid 31 in the chamber 42a flows into the reaction chamber 36 where it is vaporized by the heat of the non-volatile liquid 20. This produces an increase in pressure which pushes the non-volatile liquid 20 through the pipe 44, the open valve 56, the junction 57 and the pipe 59 into the reservoir 60. When most of the non-volatile liquid 20 has been removed from the reaction chamber 36, valves 55 and 56 are closed and valves 45, 46 and 54 are reopened. It should be noted that the chamber 42a is sufficiently large to hold enough of the volatile working fluid 31 to provide sufficient vapor pressure to pump the non-volatile liquid into the reservoir 60.

Since the pressure of the vapor 31a lifts the liquid 20 to the reservoir 60, the height of pumping is limited by the vapor pressure and the non-volatile liquid density. If it is desired to raise the non-volatile liquid still higher, an additional pumping system or even several pumping systems in series may be necessary. If desired, a plurality of engines, such as the engine 35, may be connected to the junction 57, the outlet pipe 44A and valve 56A of one such additional system being illustrated. By coordination of this plurality of engines, reasonably steady pumping of the non-volatile liquid up to the reservoir 60 may be accomplished. In this manner, smooth high-speed pumping of liquid sodium may be provided for circulation through breeder reactors in a well-known manner.

Figure 3:
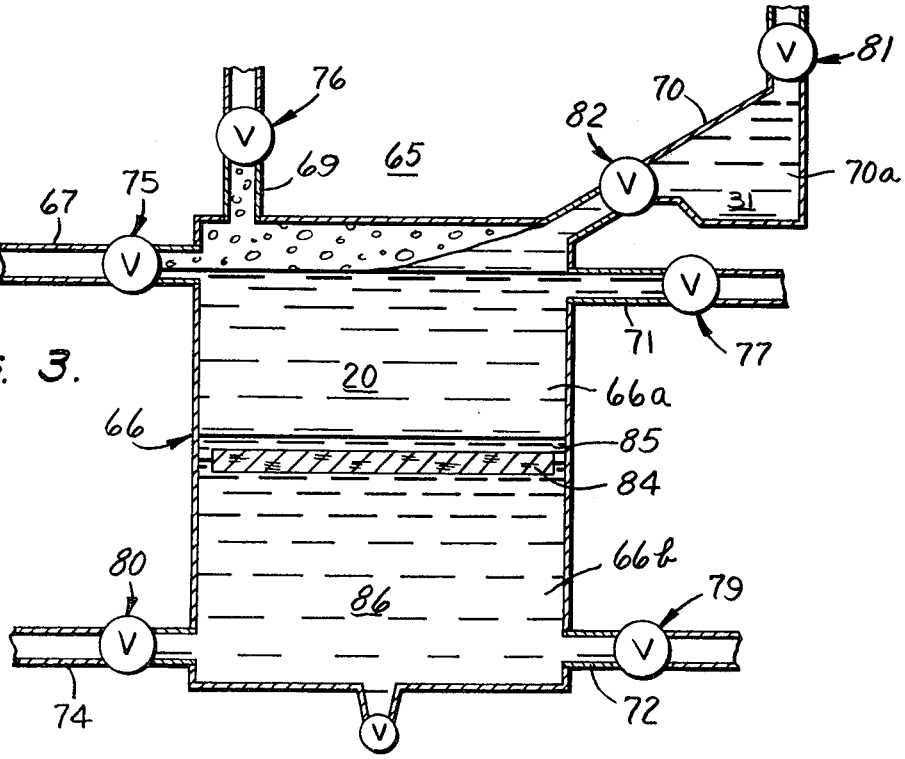
FIG. 3 is a schematic representation of an additional engine of this invention wherein the engine pumps both a non-volatile liquid and an additional liquid.

FIG. 3 illustrates an engine 65 which may contain four different liquids to be used to pump one or two of those liquids. A reaction chamber 66 has a plurality of pipes 67, 69, 70, 71, 72 and 74 extending therefrom. Valves 75, 76, 77, 79, and 80 are interposed in pipes 67, 69, 71, 72 and 74, respectively. A pair of valves 81 and 82 interposed in the pipe 70 define a chamber 70a therebetween. A float 84 and a region of separating liquid 85 divide the reaction chamber 66 into an upper chamber 66a, containing the non-volatile liquid 20 and the volatile working fluid 31, and a lower chamber 66b, containing an additional liquid 86.

The pipes 69 and 70 are connected respectively to a turbine and a condenser similar to the turbine 50 and condenser 52 of FIG. 2 so that mechanical energy for the production of electricity is produced from the heat energy of the vapor 31a in the manner previously disclosed.

To describe the operation of the engine 65, we may assume that the valve 82 is open and the volatile liquid 31 from the chamber 70a is entering the upper portion 66a of the reaction chamber 66; valves 75, 76, 80 and 81 are closed. The heated non-volatile liquid 20 which, as before, has entered the reaction chamber 66 through the pipe 67 from a source of heat (not shown), vaporizes the volatile working fluid 31, by direct contact, into vapor 31a which pushes downward and forces the additional liquid 86 to pass through the open valve 79 and upward into a reservoir (not shown) in a manner similar to the pumping of the non-volatile liquid 20 by the engine 35 of FIG. 2.

When most of the additional liquid 86 has pumped through the open valve 79, the valves 79 and 82 are closed and valve 76 is opened so that the vapor 31a goes to drive the turbines (not shown). When the pressure of the vapor 31a has greatly reduced, the valve 80 is opened and further quantities of the additional liquid 86 enter the lower portion 66b of the reaction chamber 66. This forces still more vapor 31a into the turbine.

There are several methods by which the now somewhat cooled non-volatile liquid 20 can be evacuated through the pipe 71. A sufficient quantity of the additional liquid 86 can be added so that the level rises and the liquid 20 is forced out through the valve 77 which is open. Alternatively, valve 76 may be closed and some additional quantity of the volatile working fluid 31 added after the addition of the liquid 86 and the closing of valves 79 and 80. Then, if the pipe 71 is somewhat lower than shown in the drawing, the non-volatile liquid 20 can be pumped through the pipe 71 in the manner shown in connection with FIG. 2. Thus it is possible to construct a four liquid embodiment of this invention which is capable of pumping first one liquid and then another.

In the preferred embodiment, the heated non-volatile liquid 20 is lithium while the volatile working fluid 31 is a hydrocarbon, the separating liquid 85 is a heavy (very low volatility) oil and the additional liquid 86 which is to be pumped is water. Note that lithium will react with water but the separating liquid 85 does not chemically react with either substance.

Figure 4:
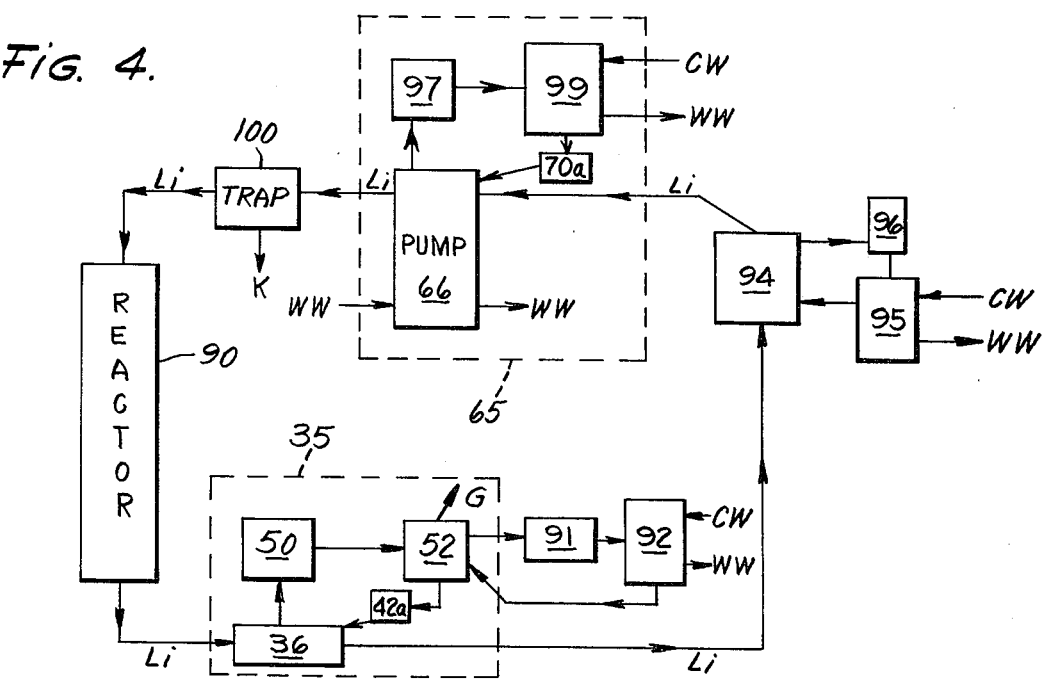
FIG. 4 is a generally schematic diagram of a system for converting heat energy of a reactor into electrical and/or mechanical energy, the system utilizing the heat engines of this invention.

Perhaps the flexibility of the engines of this invention can be best illustrated by reference to the block diagram of FIG. 4. A nuclear reactor is shown as a source of heat and is preferably a fast neutron breeder reactor using mostly $Li^7$ as the cooling liquid. Since lithium has a vapor pressure at 800°C that is less than 1% the vapor pressure of sodium at 800°C. C, will be less need for thicker containing walls between the alkaline metal and the reactor fuels if the reactor is at very high temperatures. Additionally, lithium has much more heat capacity than sodium. However, with lithium there will be some production of tritium but this valuable isotope can easily be separated from molten lithium since lithium-tritide is much heavier than, and only very slightly soluble in, cooler molten lithium.

The highly heated lithium, having a temperature in excess of 800°C, from the reactor is transmitted to an engine in the form of the engine 35 of FIG. 2 where it enters the reaction chamber or two liquid pump 36. The lithium serves as the non-volatile liquid 20 while potassium functions as the volatile working fluid 31a. Potassium has a boiling point of 760°C. Most of the potassium is vaporized and drives the turbine 50 and then passes to the heat exchanger-condenser 52 wherein the potassium is condensed and the liquid potassium goes into the chamber 42a. The gases which do not condense, e.g. tritium, helium, are drawn off from the condenser 52 as shown by G.

Condensing of the potassium in the condenser 52 causes the water, utilized for cooling therein, to boil. The steam thus produced is used to drive a conventional turbine 91 and is condensed in a condenser 92 by cool water (CW) entering the condenser 92 which leaves the condenser as warm water (WW). There is no need to filter the liquid potassium of impurities, such as lithium, since it all recycled again and again.

Although only a single two liquid pump 36 is shown, a plurality of pumps might be used all programmed together and connected to drive the turbine 50. The use of five pumps, for example, may be appropriate. The plurality of pumps preferably function in a manner similar to the cylinders of an internal combustion engine. Although the operation of one may be relatively rough, when properly time and used together, a smooth pumping action is provided. The lithium pumped by the two-liquid pumps, such as the pump 36, is sent through a conventional heat exchanger 94 wherein cooled water from a condenser is boiled into steam which drives a turbine 96. The condenser 95 is cooled by a flow of cold water.

The now cooler lithium passes from the heat exchanger 94 to a plurality of engines such as the engine 65 of FIG. 3. Although a plurality of these engines (four, for example) might be used, only one is shown for purpose of illustration. The lithium passes into the reaction chamber or four liquid pump 66.

The volatile liquid which is stored in chamber 70a before it is discharged into the four liquid pump 66 is preferably a hydrocarbon, which is vaporized before it can sink through the lighter liquid lithium where it would possibly mix the heavy non-volatile oil between the heated molten lithium and the water which is being pumped. A turbine 97 is driven in a sequential manner, as has heretofore been disclosed, by the hydrocarbon vapor from all of the four liquid pumps. A condenser 99 is cooled by cold or cool water that leaves as warmer water.

The pump 66 is shown as pumping warmed water WW but may also be used to pump cooled or cold water. It is even possible that with a complex system of many reactors, this type of pump could be used to pump liquid sodium which is heavier than the heavy non-volatile oil which is between it and the molten lithium. If desired, a conventional pump may be used in place of the four liquid pump 66.

Although potassium can be used in the reactor if it is slightly alloyed with lithium (its cross-section to slow neutrons is 2.07 barns), it would be best to minimize the percentage of potassium in the liquid lithium because the vapor pressure from an appreciable quantity of potassium would necessitate thicker walls of the cooling liquids in the reactor and hence result in less effectiveness of the reactor as a breeder as its power source. Also, an undesirable product of irradiated potassium is some argon gas.

The solubility of potassium and lithium declines as the temperature decreases. Hence, to reduce the quantity of potassium and lithium a cold trap 100, wherein the temperature is possibly lower than 200°C, may be used causing some heavier potassium to form as a liquid beneath the molten lithium. Also, lithium hydride (LiH, LiD and LiT) will settle out beneath the molten lithium.

It is possible that this trap could be formed somewhat similar to the embodiment of this invention shown in FIG. 1. As shown therein, the valve 30 could be used to drain heavy materials which are collected, such as potassium and alkaline metal hydrides, through the drain pipe 19 to be further processed. If this type of trap system were used it would be necessary that the chamber 12 be very large in relation to the quantity of liquids flowing through from the pipe 14 and out of the pipe 17.

Although there are many possible situations wherein the engine of this invention may be used with nuclear reactors, it should be understood that this invention is not limited to liquids heated thereby. For example, it may be possible that such engines may be used with hot geothermal water solutions. In such an embodiment, a volatile hydrocarbon is vaporized with a heated saline solution and by means disclosed in this invention useful work is performed. The now somewhat cooler saline solution is discharged back into the earth possibly to be reheated.

It is even possible that this invention be practiced in the refrigerating of liquids at cold or even cryogenic temperatures. Of course, there would be no power production from the turbines and energy would have to be added to the system but the principles of this invention, wherein there is a wall-less heat exchanger, still applies. To be specific, sodium and potassium form an alloy (77.2% K) that melts at −12.3°C. Such an alloy has much greater heat conductivity than do non-metallic liquids. Also, this alloy can be pumped by an electrical pump that has no moving parts and can be made very small. There may be applications where these characteristics of the sodium-potassium alloy and the fact that by the practice of this invention the direct contact evaporation of a volatile liquid will cool this alloy more easily than prior art methods will cause this to be the preferred technique.

There is a great variety of materials that might be used in the practice of this invention. Heated salts or hydroxides might be used such as hot molten sodium hydroxide which will not chemically react with water but will cause the production of steam. In fact, the non-volatile liquid 20 need not be a simple liquid at all. It might be a solution, an alloy or even a slurry such as liquid sodium and lithium-hydride.

Further possibilities for the volatile working fluid 31, in addition to hydrocarbons, are halogenated hydrocarbons such as carbon tetrachloride and freons. Rubidium might be used in place of potassium in situations where expense is of less importance. It is even possible that cesium, which boils 100°C below potassium might be used. However, the heavier metals such as cesium and mercury are both costly and have much lower specific heats.

I claim:

1. A heat engine comprising a reaction chamber having an upper portion and a lower portion separated by float means, a substantially non-volatile liquid and a volatile working fluid substantially chemically non-reactive with the non-volatile liquid in the upper portion, liquid introducing means for transporting the non-volatile liquid from a source of heat to the reaction chamber, fluid introducing means for introducing the volatile working fluid into the reaction chamber in direct physical contact with the non-volatile liquid for conversion of the volatile working fluid into a vapor, vapor removal means for removing the vapor from the chamber, liquid removal means connected to reservoir means physically elevated with respect to the reaction chamber for removing the non-volatile liquid from the chamber, each of said liquid introducing means, said fluid introducing means, said liquid removal means and said vapor removal means including valve means to control pressurization of the reaction chamber for forcing the non-volatile liquid through the liquid removal means, an additional liquid contained in the lower portion, additional liquid introducing means for transporting the additional liquid to the reaction chamber and valve means for selectively controlling the flow therein, additional liquid removal means for removing the additional liquid from the chamber and valve means for selectively controlling the flow therefrom, and energy conversion means connected between said vapor removal means and said fluid introducing means for utilization of heat energy from said vapor.

2. The heat engine of claim 1 wherein said volatile working fluid is a hydrocarbon and said non-volatile liquid is sodium.

3. The heat engine of claim 1 wherein said volatile working fluid is a hydrocarbon and said non-volatile liquid is lithium.

4. The heat engine of claim 1 wherein said volatile working fluid is water and said non-volatile liquid is sodium hydroxide.

5. The heat engine of claim 1 wherein one of said volatile working fluid and said non-volatile liquid is potassium.

6. The heat engine of claim 1 wherein said energy conversion means comprises a turbine.

7. The heat engine of claim 6 wherein said energy conversion means includes a condenser means connected between said turbine and said fluid introducing means for converting said vapor to said working fluid.

8. The heat engine of claim 1 wherein said fluid introducing means includes an additional valve between the fluid introducing valve and said reaction chamber and a fluid holding chamber between the fluid introducing valve and the additional fluid introducing valve, and said heat exchanger has a first configuration, wherein said liquid introducing valve, said vapor removal valve and said fluid introducing valve are in an open condition and the additional fluid introducing valve and said liquid removal valve are in a closed condition for the utilization of heat energy in said energy conversion means, and a second configuration wherein said liquid introducing valve, said vapor removal valve and said fluid introducing valve are closed and the additional fluid introducing valve and said liquid removal valve are opened to introduce volatile working fluid from the fluid holding chamber into said reaction chamber to produce vapor for transporting said non-volatile liquid through the liquid removal means to said reservoir means.

9. The heat engine of claim 1 wherein said float means comprises a liquid.

10. The heat exchanger of claim 9 wherein said float means includes a region of solid material.

* * * * *